(12) United States Patent
Snipes, Jr.

(10) Patent No.: US 7,481,180 B1
(45) Date of Patent: Jan. 27, 2009

(54) ANIMAL FEEDER

(76) Inventor: Keith Wayne Snipes, Jr., 277 Gar La., Lot 24, Dunn, NC (US) 28334

( * ) Notice: Subject to any disclaimer, the term of this patent is extended or adjusted under 35 U.S.C. 154(b) by 292 days.

(21) Appl. No.: 11/308,627

(22) Filed: Apr. 14, 2006

(51) Int. Cl.
*A01K 1/10* (2006.01)
*A01K 5/00* (2006.01)
*A01K 39/00* (2006.01)

(52) U.S. Cl. .................. 119/51.5; 119/410; 119/61.57; 119/51.01; 119/51.03; 119/68

(58) Field of Classification Search ............. 119/51.5, 119/410, 415, 454, 456, 464, 475, 51.01, 119/51.03, 70, 71, 57.8, 61.4, 61.57, 477, 119/60, 68, 69; D30/121, 124, 125, 127, D30/128, 129
See application file for complete search history.

(56) References Cited

U.S. PATENT DOCUMENTS

| | | | |
|---|---|---|---|
| 1,594,535 A * | 8/1926 | Lindbeck | 220/478 |
| 1,597,078 A * | 8/1926 | Knutson | 119/71 |
| 1,996,690 A * | 4/1935 | Schlegel | 119/456 |
| 2,501,146 A * | 3/1950 | Stevens | 119/71 |
| 2,613,642 A * | 10/1952 | Hiller | 119/71 |
| 2,753,840 A * | 7/1956 | Patrie et al. | 119/477 |
| 2,833,247 A | 5/1958 | Beyea | 119/51 |
| 3,675,783 A * | 7/1972 | Reese | 211/85.19 |
| 3,892,315 A * | 7/1975 | Johnson | 211/85.19 |
| D281,394 S * | 11/1985 | Porta | D8/401 |
| 5,052,342 A | 10/1991 | Schneider | 119/51.03 |
| 5,143,022 A | 9/1992 | Fore | 119/51.03 |
| 5,183,005 A * | 2/1993 | Tyler | 119/52.2 |
| 5,421,290 A * | 6/1995 | Welch | 119/51.11 |
| 6,386,142 B1 * | 5/2002 | Holscher et al. | 119/57.8 |
| 7,004,110 B2 * | 2/2006 | Morikoshi et al. | 119/61.57 |
| 7,296,538 B1 * | 11/2007 | Pridgen | 119/59 |

* cited by examiner

*Primary Examiner*—Andrea M Valenti
(74) *Attorney, Agent, or Firm*—Ishaman Law Firm P.C.

(57) ABSTRACT

An animal feeder includes an open ended food container that is hinge mounted at a normal inclined position on a ground support. The container pivots upwardly about a fixed horizontal transverse axis when the animal tries to remove the container from the support. This unnatural, upwardly pivoting movement discourages further attempts to remove the feeder, and the animal, thus discouraged, continues to feed at the site.

11 Claims, 8 Drawing Sheets

ANIMAL FEEDER

FIELD OF THE INVENTION

The present invention relates to animal feeders, and more particularly to feeders for feral animals.

BACKGROUND OF THE INVENTION

It is well know that the use of feed will attract feral birds and animals. Attracting such animals has always been more difficult because of their natural wariness.

Salt licks, of course, have been used by both domestic and wild animals and are a known attractant. Even special salt licks have been formulated and used in an attempt to attract animals, more particularly hoofed animals, such as deer, antelope and the like. Also, products such as molasses dispensers have been used in attempts to attract these animals.

Although the prior known feeders have been somewhat successful, they have proved to be far from irresistible.

Another problem encountered in the use of animal feeders is that the animals tend to try to bite and pull the feeder from its location. This is particularly true for wild animals where the feeder is in an open, relatively unprotected area.

Examples of the foregoing include U.S. Pat. No. 5,143,022 to Fore that discloses a deer feeder in the form of a hanging bottle that dispenses molasses when the device is licked by an animal. Also, U.S. Pat. No. 5,052,342 to Schneider discloses a suet-seed cake bird feeder that is suspended from the top. A further example, is disclosed in U.S. Pat. No. 2,833,247 to Beyea wherein a salt holder is fixedly mounted on a post.

In view of the limitations of the foregoing, it would be desirable to provide an animal feeder for wild animals that is enticing as a feeder but resists the inclination for damage or removal by the animal.

SUMMARY OF THE INVENTION

The present invention provides an animal feeder that is very attractive to animals while at the same time being tough and damage resistant. The animal feeder comprises an open ended container carrying a desired food that is hingedly mounted at an adjustable upwardly inclined position on a ground support.

The container pivots upwardly about a fixed horizontal transverse axis when the animal tries to remove the container from the support. This unnatural, upwardly pivoting movement has been found to discourage further attempts to remove the feeder, and the animal, thus discouraged, continues to feed at the container.

The animal feeder may be free standing or mounted on available ground supports, such as trees or posts. In a preferred form, the feeder is mounted on a vertical post terminating at a lower end with a ground penetrating auger, allowing the feeder to be easily installed in various desired locations such as dense woods, along trails, near water holes or in clearings where animals feed, which is particularly advantageous to hunters using the device.

In one aspect, the container is an open ended cylindrical container that is mounted on a backing plate hinged to the support for movement about a fixed horizontal transverse axis. In a preferred format, the cylinder is a food container, such as a peanut butter jar, wherein the bottom is removed and the cap is mounted on the backing plate. Peanut butter is an enticing feed for animals, particularly hooved animals such as deer, antelope and the like.

Accordingly, it is an object of the invention to provide an animal feeder that can be easily transported and quickly installed.

Another object of the present invention is to provide an animal feeder that discourages tugging and pulling on the feeder by the animal using the feeder.

Another object of the invention is to provide a simple and yet highly efficient animal feeder that is specifically adapted to accept off the shelf containers of an animal attractive feed such as peanut butter.

BRIEF DESCRIPTION OF DRAWINGS

The above and other features and advantages of the present invention will become apparent upon reading the following description of the preferred embodiments taken in conjunction with accompanying drawings in which.

DETAILED DESCRIPTION OF THE PREFERRED EMBODIMENTS

Figure 1:
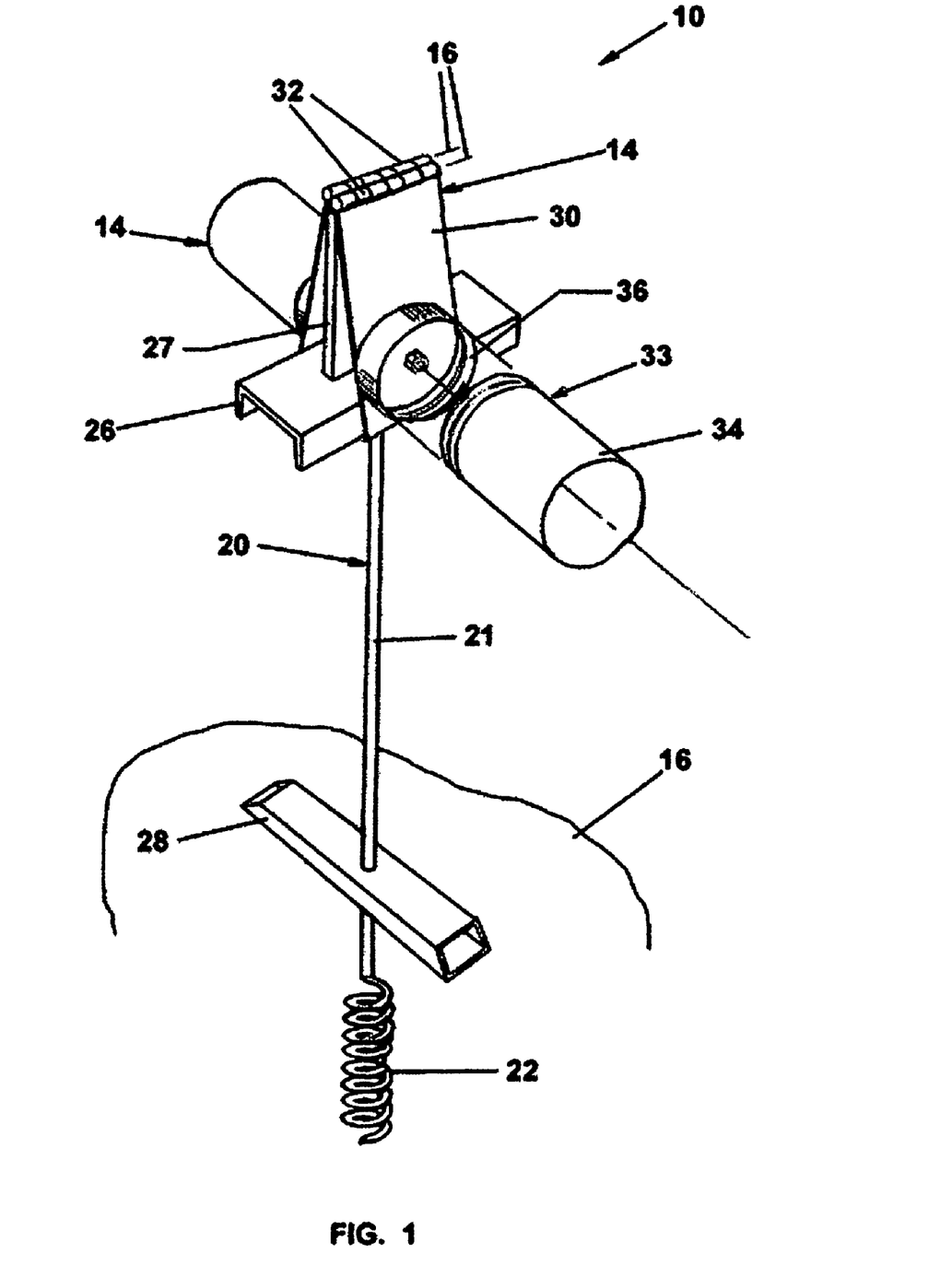
FIG. 1 is a perspective view of an animal feeder in accordance with an embodiment of the invention.
Figure 2:
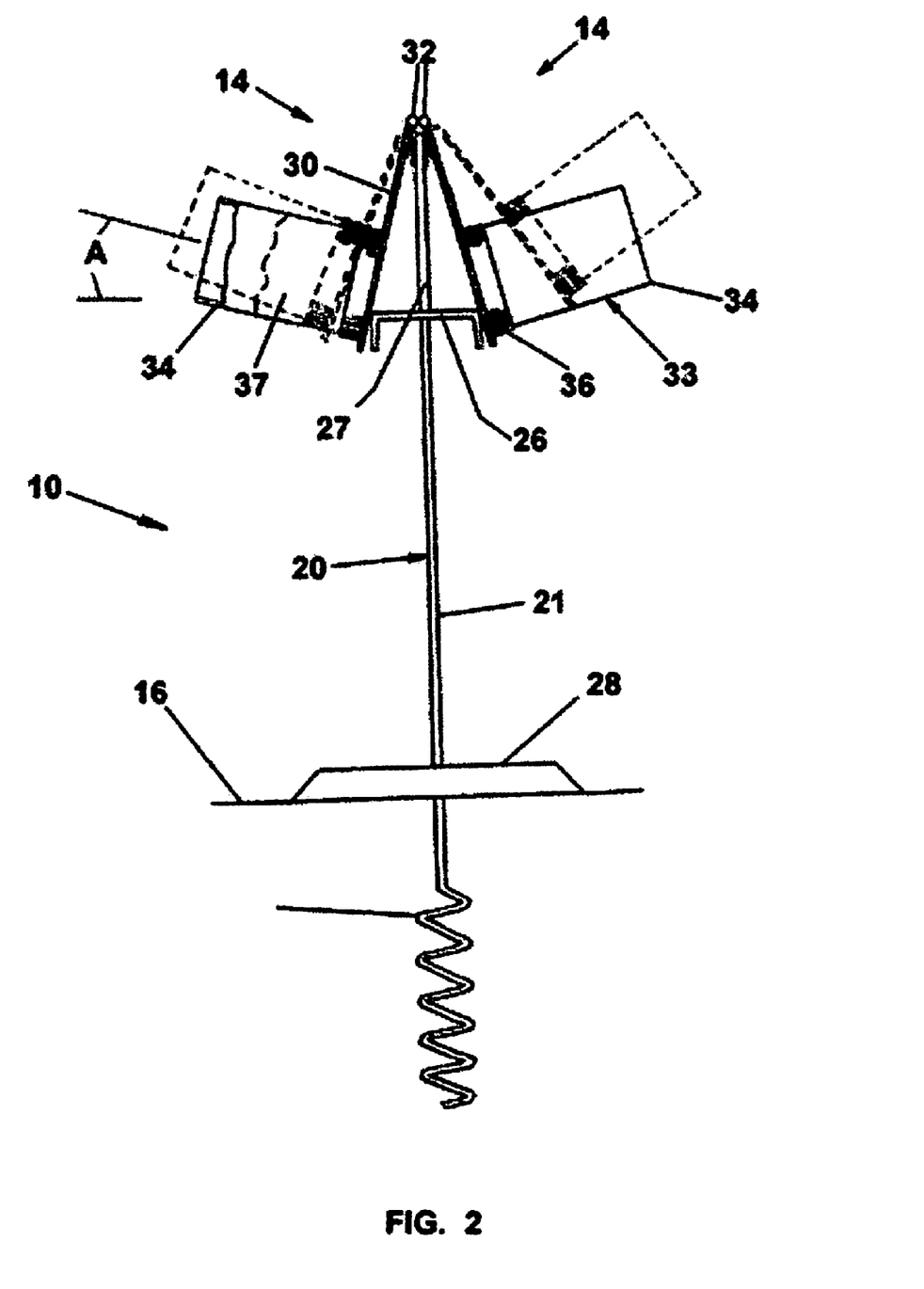
FIG. 2 is a front view of the animal feeder of FIG. 1.
Figure 3:
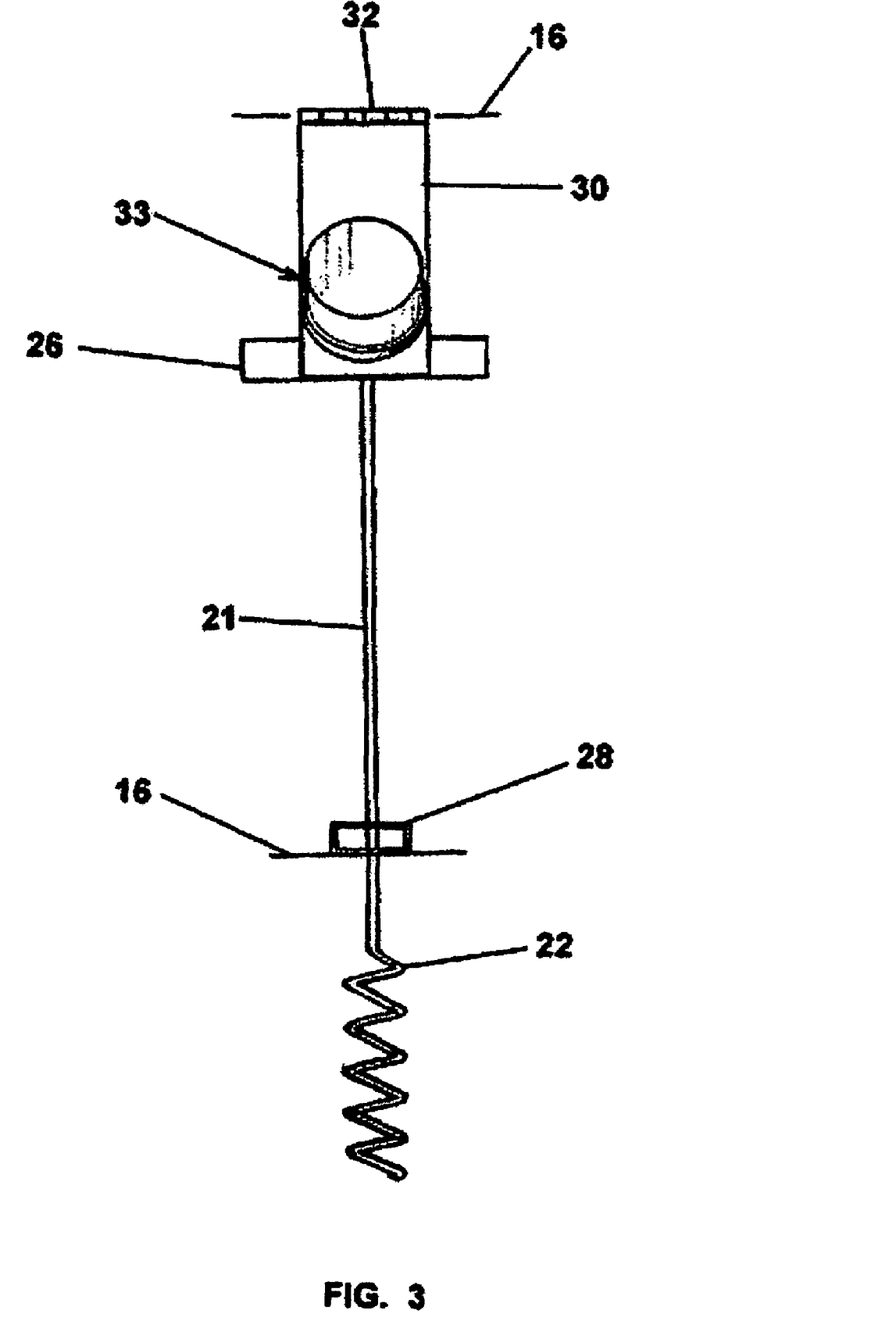
FIG. 3 is a side view of the animal feeder of FIG. 1.

Referring to FIGS. 1 through 3, there is shown an animal feeder 10 mounted as a free standing unit in a ground area 12 located for attracting wild animals thereto, particularly hooved animals such as deer. The animal feeder includes a pair of open ended feeding container assemblies 14. The container assemblies are supported in an upwardly inclined angle "A" in normal position, shown in solid lines in FIG. 2, and pivot upwardly when pulled to further upwardly inclined positions shown in dashed lines, by hinged pivotal movement about fixed horizontal transverse axes 16. The resultant upward movement is an unnatural movement that discourages the animal from further attempts at removal.

Figure 5:
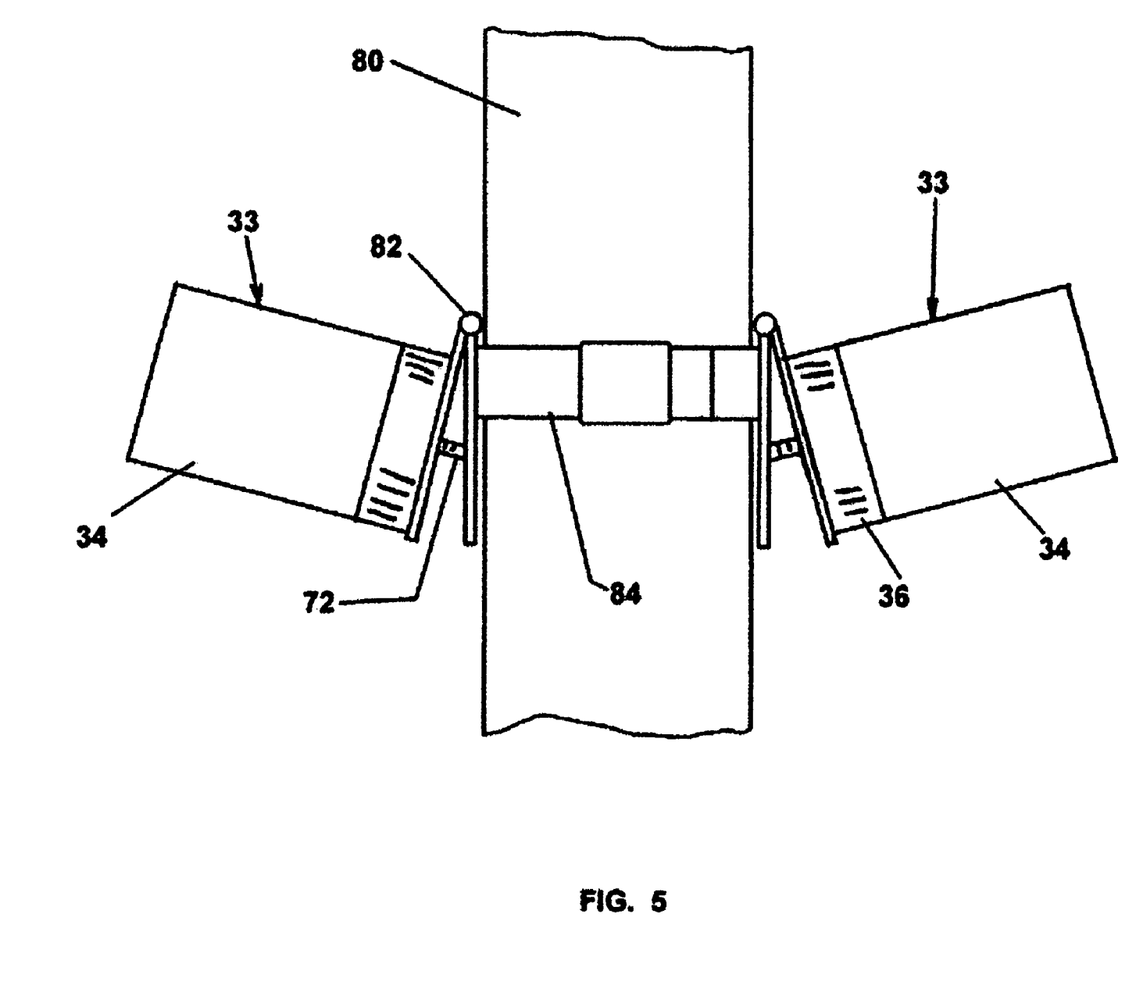
FIG. 5 is a front view of an animal feeder in accordance with another embodiment of the invention.

The animal feeder 10 includes a ground support 20 including a support arm 21 having a helical screw anchor or auger 22 attached at a lower end, and a horizontal upper cross bar 26 attached at an upper end that upwardly terminates with a rectangular upwardly extending support plate 27. The upper cross bar 26 is centrally apertured and transversely attached on the upper end of the support arm 20 by suitable fastening means such as welds. The upper cross bar 26 engages a rear surface of the container assemblies 14 for establishing the normal position. A lower cross bar 28 is centrally apertured and transversely attached on a lower portion on the support arm 21 adjacent the auger 22 by suitable fastening means such as welds. For ease of installation at a suitable site, the user may use the lower cross bar 28 to apply downward foot force on the auger 22 while using the upper cross bar 26 to apply rotational force on the support arm 20 to thereby auger the feeder into the ground area, with the lower cross arm engaging the ground to provide a base support. As shown in FIG. 5, the lower cross arm 28 may be provided with diagonal braces 29 to provide additional rigidity to the ground support. The upper cross arm 26 is formed of suitable stock such as channel. The lower cross arm 28 is formed of suitable stock such as rectangular tubing. The outer ends of the cross arm 28 may be beveled to avoid sharp corners.

Each container assembly 14 includes a rectangular backing plate 30 attached to one hinge plate of a hinge assembly 32 having a hinge pin establishing the pivot axis 16, and an open ended animal food container 33 having a cylindrical base 34 threaded to a complementary twist-off cap 36 mounted on the front surface of the backing plate 30 by a suitable fastener, such nut and bolt fastener assembly 38. The other hinge plate of the hinge assembly 32 is attached to a side surface of the support plate 27. Accordingly, the container 33 is movable between the previously described positions as accommodated by the hinge assembly 32.

Preferably, the food container is a commercially available brand of food attractive to animals. A particularly attractive food is peanut butter, which is available in plastic jars. For use in the invention, the bottom of the base is removed to provide an access opening for the animal for access to the food supply. The bottom may be removed before or after mounting on the animal feeder. Alternative food material in similar packaging may be used. Also, empty containers of such types may be supplied with the desired animal attractive food. Varying sized containers may be used. A 16 oz. plastic jar configuration has been found effective with deer.

The inclination and vertical height of the container is selected to provide access for adult animals with a slight downward disposition of the head and tongue. The inclination also provides resistance against spilling. In the event, the animal grasps the container seeking removal from the location, the normal head raising or rearward movement of the animal upwardly pivots the container thereby providing an unnatural, unexpected movement which has been demonstrated to discourage further attempts at removal. Inclinations ranging between 5° and 30° have provided desired results with an inclination of between 10° and 20° preferred. Too low an inclination contributes to food spillage and lesser startling on the animal upon rotation, and too high an angle exposes the food to rain and debris and limits the animal size in use.

Testing has demonstrated that the aroma of the peanut butter or other food mixtures such as various combinations of corn, molasses, and salt will quickly attract deer and other animals. When consumed, a new container may be used with the existing cap, and removing the bottom of the new container to expose the food. Other mixtures may be added to the existing container as needed. Also, whenever it is desired to move the feeder, the support may be rotated to release the auger from the ground and installed in a new location or stored for subsequent use.

Figure 4:
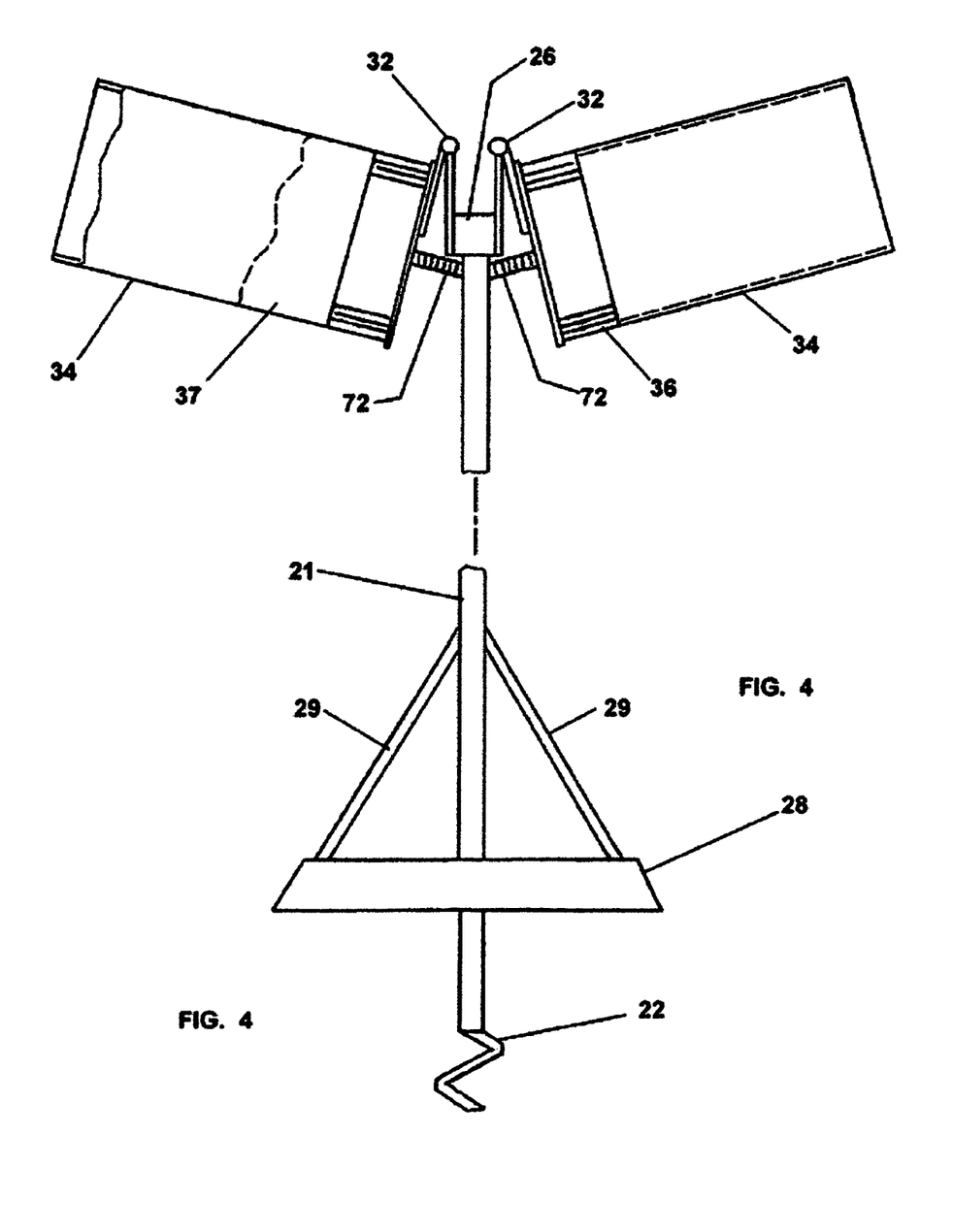
FIG. 4 is a front view of an animal feeder in accordance with another embodiment of the invention.

Another embodiment is shown in FIG. 4 wherein the support arm and lower cross arm are reinforced by diagonal braces 29. The hinges 32 are mounted directly on the upper cross arm 26. The fastener for the cap 36 includes at projecting shank 72 that directly engages the support arm 21 to provide the desired normal inclination of the container 34. The fastener may be axially adjustable for varying the inclination of the container.

A further embodiment is shown in FIG. 5 for use with an on-site support 80 such as trees or posts. Therein, the container assembly 14 comprising the container base 34, cap 36 and hinge and backing plate assembly 82 are secured to the support with an adjustable strap assembly 84. The container assembly may be disposed singularly or in multiple units around the support. The strap assembly 84 may include tightening means such a ratchet assembly for tightly securing the container assemblies to the support.

Figure 6:
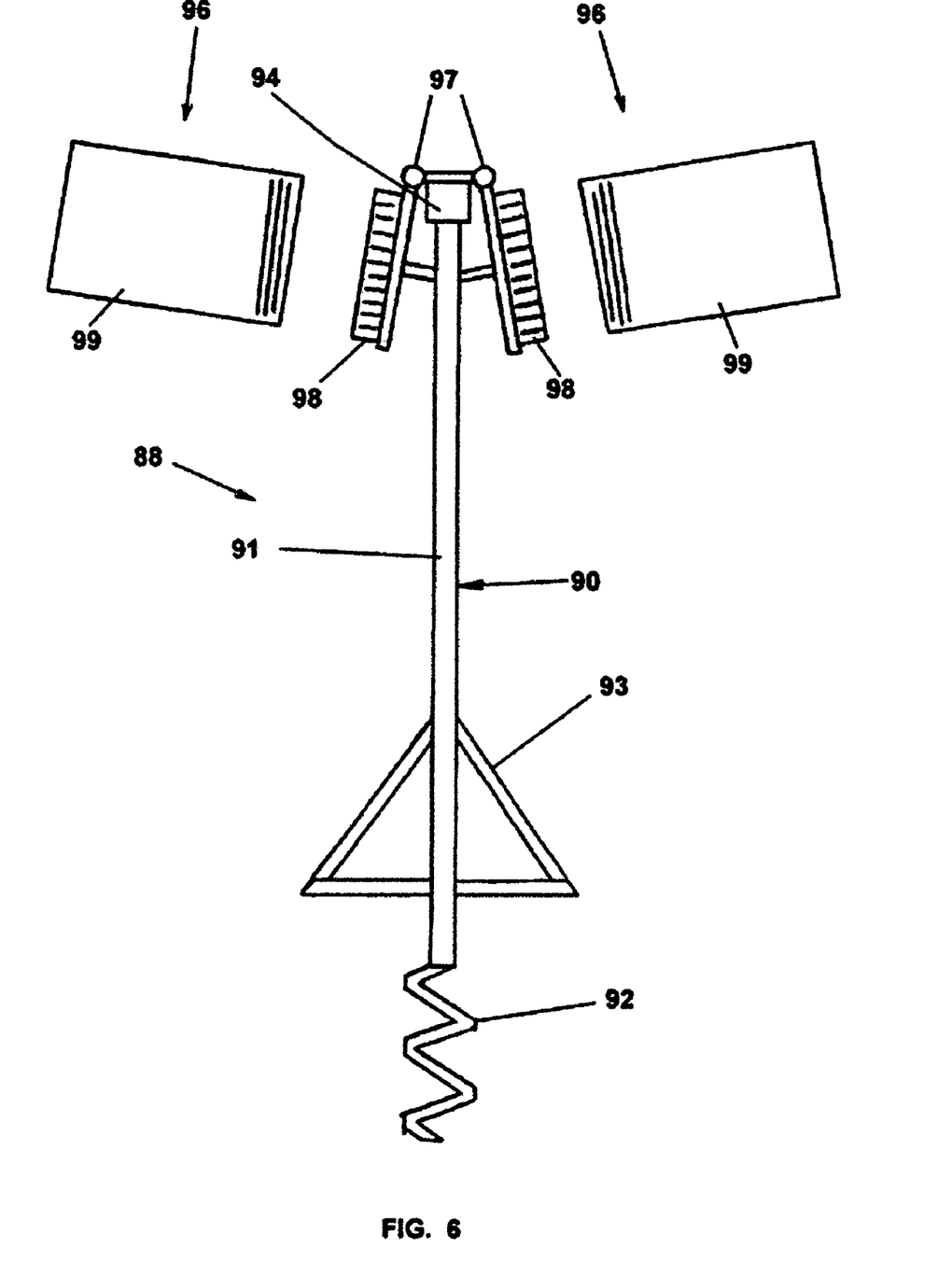
FIG. 6 is a front view of an animal feeder in accordance with another embodiment of the invention.

Referring to FIG. 6, there is shown another embodiment of an animal feeder 88 wherein a ground support 90 includes a support arm 91 has a ground penetrating helical screw anchor or auger 92 attached at a lower end, a brace assembly 93 connected to a middle portion, and a horizontal upper cross bar 94 attached at an upper end and supporting a pair of inclined feeder container assemblies 96 at spaced hinges 97. Each container assembly 96 includes a cap 98 connected to a plate at the hinge 97 and an open ended container 99 threaded to the cap, as described above, with projections maintaining the normal inclination of the container.

Figure 7:
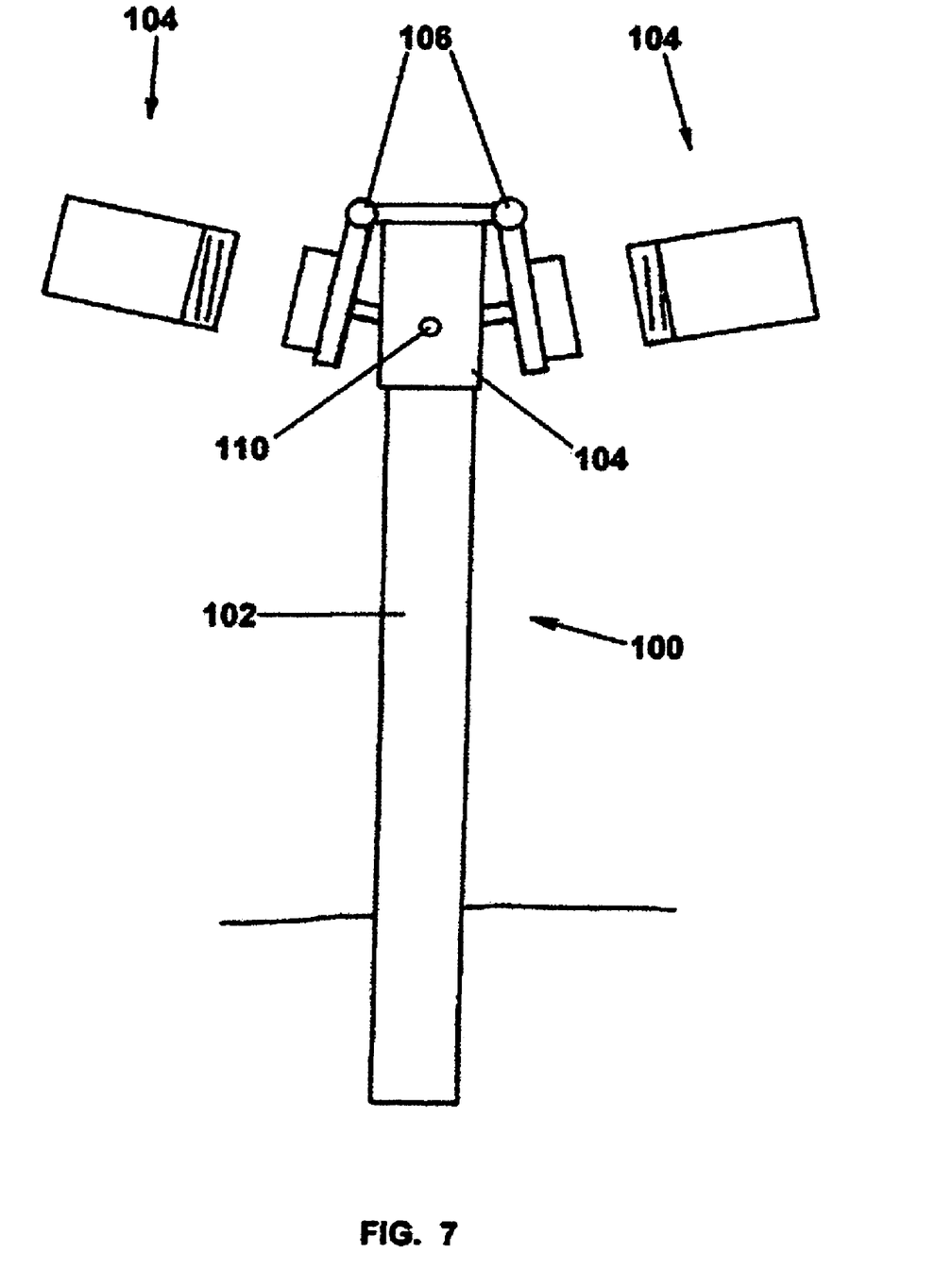
FIG. 7 is a front view of an animal feeder in accordance with another embodiment of the invention.
Figure 8:
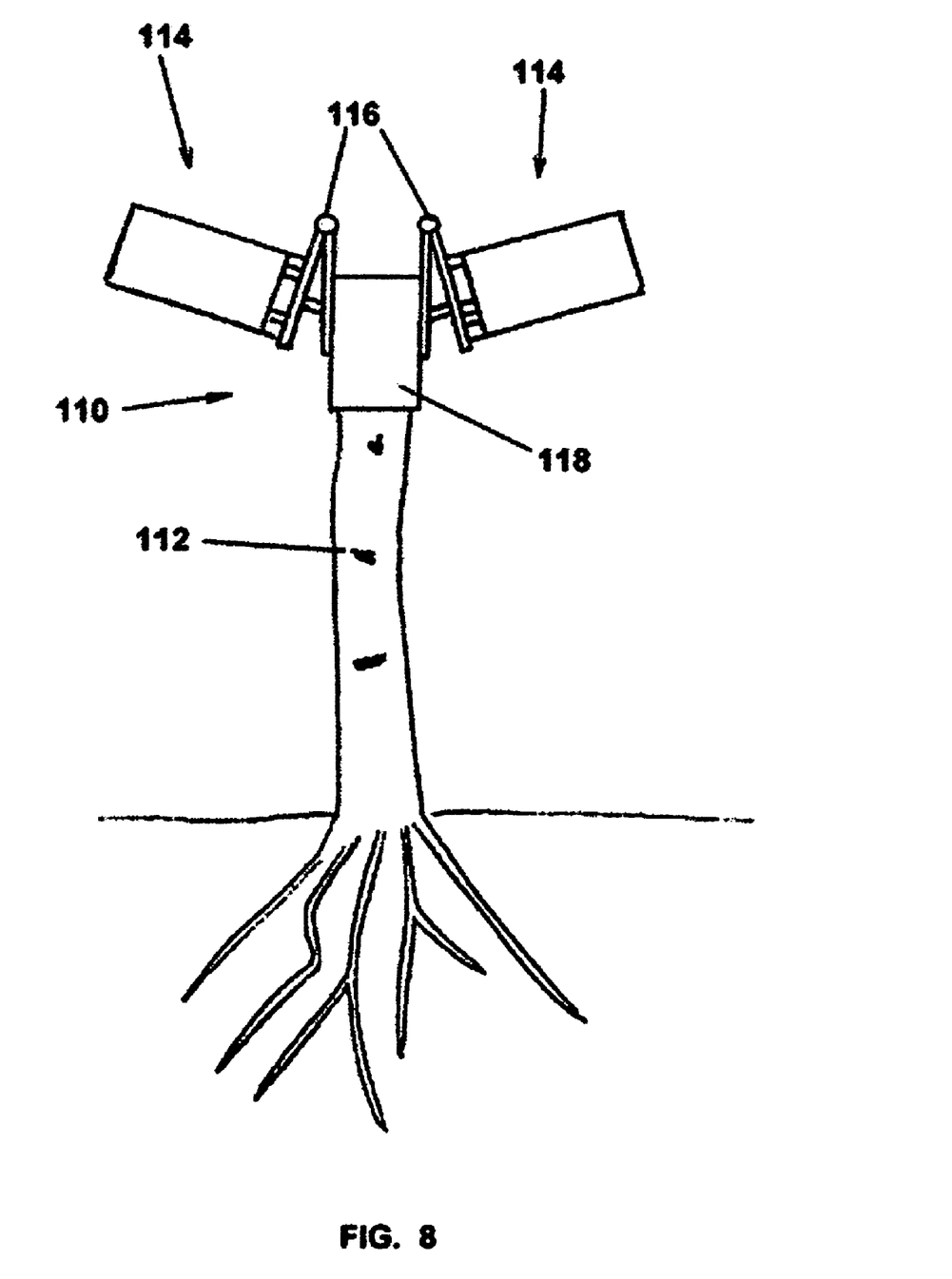
FIG. 8 is a front view of an animal feeder in accordance with another embodiment of the invention.

Referring to FIG. 7, there is shown another embodiment of an animal feeder 100 for use with a post 102 embedded in the ground. The animal feeder 100 includes a pair of inclined feeder container assemblies 104, as described above, connected by hinges 106 to the base of a downwardly opening cylindrical support cap 108 telescopically received over the upper end of the post, and attached thereto by fasteners 110. Referring to FIG. 8, there is shown another embodiment of an animal feeder 110 for use with a tree stump 112. The animal feeder 110 includes a pair of inclined feeder container assemblies 114, as described above, connected by hinges 116 to the sides of a downwardly opening cylindrical support cap 108 telescopically received over the upper end of the tree stump 112.

In all of the foregoing and in other embodiments, the animal feeder in accordance with the invention provides a sturdy, easily installed and removed animal feeder with food containers that may be readily refilled or replaced. The feeder is relatively inexpensive to construct and provides an unnatural pivoting motion when moved which discourages animals from attempting to remove the food containers from the feeder.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and description herein are intended to be illustrative and are not in any sense limiting of the invention, which is defined solely in accordance with the following claims.

What is claimed is:

1. An animal feeder for an animal at a selected feeding site, comprising: a ground support member vertically supported at the site; at least one cylindrical food container characterized by a cap member and a base member connected at a threaded connection with a bottom portion of the base member remote from said threaded connection removed to provide an open ended cavity for holding food attractive to the animal; a plate member; a hinge member pivotally connecting said plate member to an upper portion of said ground support member at a fixed transverse horizontal axis, said cap member being fixedly connected to said plate member with said cavity facing outward; and stop means between said cap member and said support member providing a normal position for said food container inclined upwardly and outwardly an angle of between about 5° to 30° with respect to a horizontal plane while permitting additional pivotal movement upwardly from said normal position upon pulling by the animal thereby providing an unnatural response discouraging the animal from further pulling.

2. The animal feeder as recited in claim 1 wherein said support member includes an elongated arm member having a ground penetrating lower end for removable installation at the site.

3. The animal feeder as recited in claim 2 wherein said ground penetrating lower end is a helical auger.

4. The animal feeder as recited in claim 2 wherein said support member includes a transverse lower cross member at a lower end for assisting ground penetrating installation at the site.

5. The animal feeder as recited in claim 4 wherein said cap member is connected to a planar backing member operatively connected to said hinge means.

6. The animal feeder as recited in claim 5 wherein said backing member is engagable with said arm member to establish said stop means for said normal position.

7. The animal feeder as recited in claim 6 wherein said cap member is connected to said backing member with a fastener having a projecting portion engaging said support member to establish said stop means for said normal position.

8. The animal feeder as recited in claim 1 wherein said support member is an existing vertical member at the site and including adjustable strap means for connecting said hinge means and said food container to said existing vertical member.

9. The animal feeder as recited in claim 1 wherein said support member is an existing vertical member at the site and including a cylindrical cap member connecting said hinge means and said food container, said cap member being telescopically inserted over an upper end of said existing vertical member.

10. The animal feeder as recited in claim 1 wherein said food container is a plastic jar with a bottom portion removed and containing peanut butter in said cavity providing access thereto by the animal.

11. The animal feeder as recited in claim 1 wherein said angle is between about 10° to 20° to limit spillage of food in said cavity while providing environmental protection therefor.

* * * * *